US012189930B2

(12) United States Patent
Lin et al.

(10) Patent No.: US 12,189,930 B2
(45) Date of Patent: Jan. 7, 2025

(54) INTERACTION METHOD OF MULTIMEDIA SEGMENTATION, APPARATUS, DEVICE AND STORAGE MEDIUM

(71) Applicant: Beijing Bytedance Network Technology Co., Ltd., Beijing (CN)

(72) Inventors: Zhaoqin Lin, Beijing (CN); Qifan Zheng, Beijing (CN); Yan Zeng, Beijing (CN); Pingfei Fu, Beijing (CN); Chen Zhao, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/069,839

(22) Filed: Dec. 21, 2022

(65) Prior Publication Data
US 2023/0185438 A1 Jun. 15, 2023

Related U.S. Application Data

(63) Continuation of application No. PCT/CN2021/107367, filed on Jul. 20, 2021.

(30) Foreign Application Priority Data

Jul. 23, 2020 (CN) .......................... 202010718080.X

(51) Int. Cl.
G06F 17/00 (2019.01)
G06F 3/04842 (2022.01)
(52) U.S. Cl.
CPC .................. G06F 3/04842 (2013.01)
(58) Field of Classification Search
CPC ................ G06F 3/04842; H04N 5/262; H04N 21/44008; H04N 21/47205; H04N 5/265;
(Continued)

(56) References Cited

U.S. PATENT DOCUMENTS 8,244,103 B1   8/2012 Shore
10,692,536 B1 * 6/2020 Johnson ................. G11B 27/34
(Continued)

FOREIGN PATENT DOCUMENTS

CN        1185256 A    6/1998
CN      108156407 A    6/2018
(Continued)

OTHER PUBLICATIONS

Casares, Juan, et al. "Simplifying video editing using metadata." Proceedings of the 4th conference on Designing interactive systems: processes, practices, methods, and techniques. 2002 (Year: 2002).*
(Continued)

Primary Examiner — Andrew T McIntosh
(74) Attorney, Agent, or Firm — Astute IP Law Group

(57) ABSTRACT

An interaction method of audio-video segmentation and apparatus, and a device and a storage medium. The method includes: detecting whether a selected clip exists in a target audio-video; in response to the selected clip existing in the target audio-video, displaying a split button upon detecting that a pointer on a track of the target audio-video is located in the selected clip; and splitting the selected clip, in response to a trigger operation for the split button, based on an intersection position of the pointer and the selected clip. Compared with an interaction means in which a split button resides in a pointer of a track, mis-operations of audio-video splitting can be reduced to the greatest extent, and the usage experience of a user is improved to a certain extent.

17 Claims, 4 Drawing Sheets

(58) Field of Classification Search
CPC ............... H04N 21/431; H04N 21/485; H04N 21/8106; H04N 21/8456
See application file for complete search history.

(56) References Cited

U.S. PATENT DOCUMENTS

| | | | |
|---|---|---|---|
| 2010/0250510 A1* | 9/2010 | Herberger | G06F 16/00 707/705 |
| 2010/0280638 A1* | 11/2010 | Matsuda | G06F 3/165 700/94 |
| 2010/0281379 A1 | 11/2010 | Meaney et al. | |
| 2010/0281385 A1* | 11/2010 | Meaney | G11B 27/34 715/830 |
| 2011/0258547 A1* | 10/2011 | Symons | G06F 3/0486 715/723 |
| 2012/0210230 A1* | 8/2012 | Matsuda | G06F 3/04847 715/723 |
| 2012/0210231 A1* | 8/2012 | Ubillos | G11B 27/034 715/723 |
| 2013/0073961 A1* | 3/2013 | Agnoli | G11B 27/034 715/716 |
| 2013/0121668 A1* | 5/2013 | Meaney | H04N 21/21805 386/282 |
| 2014/0321829 A1 | 10/2014 | Shore | |
| 2015/0194184 A1* | 7/2015 | van Bavel | G06F 3/04842 715/723 |
| 2015/0370474 A1* | 12/2015 | Belaunde | G06F 16/7867 715/723 |
| 2018/0199080 A1* | 7/2018 | Jackson, Jr. | H04N 21/8549 |
| 2019/0104259 A1* | 4/2019 | Angquist | G11B 27/34 |

FOREIGN PATENT DOCUMENTS

| | | |
|---|---|---|
| CN | 109213400 A | 1/2019 |
| CN | 110166652 A | 8/2019 |
| CN | 305492138 S | 12/2019 |
| CN | 110971957 A | 4/2020 |
| CN | 305933488 S | 7/2020 |
| CN | 111901534 A | 11/2020 |
| JP | 11-146322 A | 5/1999 |
| JP | 2016-105597 A | 6/2016 |

OTHER PUBLICATIONS

Myers, Brad A., et al. "A multi-view intelligent editor for digital video libraries." Proceedings of the 1st ACM/IEEE-CS joint conference on Digital libraries. 2001 (Year: 2001).*

Diakopoulos, Nicholas, and Irfan Essa. "Videotater: an approach for pen-based digital video segmentation and tagging." Proceedings of the 19th annual ACM symposium on User interface software and technology. 2006 (Year: 2006).*

Extended European Search Report mailed Nov. 7, 2023, in EP21847150. 6, 7 pages.

Notice of Decision to Grant for Japanese Patent Application No. 2023-504034, mailed Mar. 19, 2024, 5 pages.

International Search Report and Written Opinion issued in International Patent Application No. PCT/CN2021/107367 on Oct. 20, 2021.

Youko video entitled: "Videoleap editing tool split and merge—common tools for video production—education—HD full genuine video online—Youku," [retrieved Apr. 18, 2020]. Retrieved from the Internet: https://v-wb.youku.com/v_show/id_XNDYzNzc1NjlwMA==.html.

* cited by examiner

INTERACTION METHOD OF MULTIMEDIA SEGMENTATION, APPARATUS, DEVICE AND STORAGE MEDIUM

CROSS-REFERENCE TO RELATED APPLICATION

The present application is a continuation of International Patent Application No. PCT/CN2021/107367, filed on Jul. 20, 2021, which claims priority of Chinese Patent Application No. 202010718080.X, filed on Jul. 23, 2020, and the entire content disclosed by the Chinese patent application is incorporated herein by reference as part of the present application.

TECHNICAL FIELD

The present disclosure relates to a field of audio-video clipping, and more particularly, to an interaction method of audio-video segmentation, an apparatus, a device, and a storage medium.

BACKGROUND

Audio-video segmentation is a common function of an audio-video clipping tool, which refers to audio-video clipping by splitting a target audio-video into a plurality of audio-video clips.

At present, in an interaction process of splitting audio-video, a pointer of a track always has a split button displayed, for example, a "scissor" button, which is used to trigger an audio-video splitting operation based on a split point positioned by the pointer.

However, because the split button is resident on the pointer of the track, even if a user does not need to split the audio-video, misoperation of audio-video segmentation may be caused by mistriggering of the user, which affects the user experience to a certain extent.

SUMMARY

In order to solve the above-described technical problems or at least partially solve the above-described technical problems, the present disclosure provides an interaction method of audio-video splitting, an apparatus, a device and a storage medium, which can reduce occurrence of misoperation of audio-video splitting, and further improve the user experience.

In a first second, the present disclosure provides an interaction method of audio-video splitting, the method includes:

detecting whether a selected clip exists in a target audio-video;

in response to the selected clip existing in the target audio-video, displaying a split button upon detecting that a pointer on a track of the target audio-video is located in the selected clip;

splitting the selected clip, in response to a trigger operation for the split button, based on an intersection position of the pointer and the selected clip.

In an optional embodiment, the method further includes:

in response to an absence of the selected clip in the target audio-video, displaying the split button upon detecting that a mouse moves to an intersection position of the pointer and the target audio-video;

splitting the target audio-video, in response to the trigger operation for the split button, based on the intersection position of the pointer and the target audio-video.

In an optional embodiment, the displaying a split button upon detecting that a pointer on a track of the target audio-video is located in the selected clip, includes:

in response to detecting that the pointer on the track of the target audio-video is located in the selected clip, displaying the split button in the intersection position of the pointer and the selected clip.

In an optional embodiment, before the splitting the selected clip, in response to a trigger operation for the split button, based on an intersection position of the pointer and the selected clip, the method further includes:

highlighting, in response to detecting that a mouse moves to a position of the split button, the intersection position of the pointer and the selected clip.

In an optional embodiment, the displaying the split button upon detecting that a mouse moves to an intersection position of the pointer and the target audio-video, includes:

displaying, in response to detecting that the mouse moves to the intersection position of the pointer and the target audio-video, the split button in the intersection position of the pointer and the target audio-video.

In an optional embodiment, before the splitting the target audio-video, in response to the trigger operation for the split button, based on the intersection position of the pointer and the target audio-video, the method further includes:

highlighting, in response to detecting that the mouse moves to a position of the split button, the intersection position of the pointer and the target audio-video.

In an optional embodiment, after the response to an absence of the selected clip in the target audio-video, and before the splitting the target audio-video, in response to the trigger operation for the split button, based on the intersection position of the pointer and the target audio-video, the method further includes:

triggering, in response to detecting that the mouse moves to an intersection position of the pointer and a caption corresponding to the target audio-video, a step of displaying the split button.

In a second aspect, the present disclosure provides an interaction apparatus of audio-video splitting, the apparatus includes:

a first detection module, configured to detect whether a selected clip exists in a target audio-video;

a first display module, configured to display a split button upon detecting that a pointer on a track of the target audio-video is located in the selected clip in response to the selected clip existing in the target audio-video;

a first splitting module, configured to split the selected clip, in response to a trigger operation for the split button, based on an intersection position of the pointer and the selected clip.

In an optional embodiment, the apparatus further includes:

a second display module, configured to display the split button upon detecting that a mouse moves to an intersection position of the pointer and the target audio-video in response to an absence of the selected clip in the target audio-video;

a second splitting module, configured to split the target audio-video, in response to the trigger operation for the split button, based on the intersection position of the pointer and the target audio-video.

In a third aspect, the present disclosure provides a computer-readable storage medium, wherein the computer-readable storage medium stores instructions, and the instructions, when run on a terminal device, enables the terminal device to implement the method described above.

In a fourth aspect, the present disclosure provides a device, the device includes a memory, a processor, and a computer program stored on the memory and runnable on the processor, in a case where the processor executes the computer program, the method described above is achieved.

Compared with the prior art, the technical solutions provided by embodiments of the present disclosure have the following advantages:

An embodiment of the present disclosure provides an interaction method of audio-video splitting. Firstly, detecting whether a selected clip exists in a target audio-video; if exists, entering a mode for splitting a selected clip. Specifically, when detecting that a pointer on a track of the target audio-video is located in the selected clip, displaying a split button, and when receiving a trigger operation for the split button, splitting the selected clip based on an intersection position of the pointer and the selected clip. As compared with the interaction mode in which the split button is resident on the pointer of the track, the embodiment of the present disclosure displays the split button when detecting that the pointer is located in the selected clip. Because movement of the pointer to the selected clip indicates that the user currently has an audio-video splitting demand, displaying the split button at this time can facilitate the user triggering a split operation on the selected clip. In addition, the split button is displayed only when the user has an audio-video splitting demand, which may reduce misoperation of audio-video splitting to the greatest extent, and improve the user experience to a certain extent.

BRIEF DESCRIPTION OF THE DRAWINGS

The drawings herein are incorporated into and constitute a part of the specification, illustrate embodiments consistent with the disclosure, and together with the specification, serve to explain the principles of the disclosure.

In order to more clearly explain the embodiments of the present disclosure or the technical solutions in the prior art, the following will briefly introduce the drawings that need to be used in the description of the embodiments or the prior art. Obviously, for those of ordinary skill in the art, other drawings can be obtained according to these drawings without paying creative labor.

DETAILED DESCRIPTION

Figure 1:
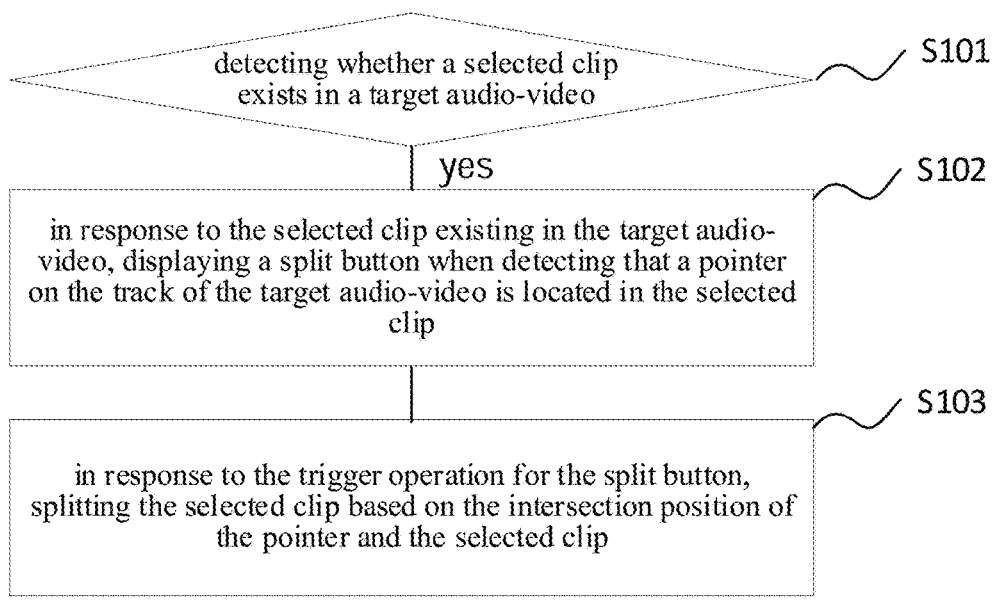
FIG. 1 is a flow chart of an interaction method of audio-video splitting provided by an embodiment of the present disclosure.

In order to be able to more clearly understand the above objects, features and advantages of the present disclosure, the scheme of the present disclosure will be further described below. It should be noted that the embodiments of the present disclosure and the features in the embodiments can be combined with each other without conflict.

In the following description, many specific details are set forth in order to fully understand the present disclosure, but the present disclosure can also be implemented in other ways than those described here; Obviously, the embodiments in the specification are only part of the embodiments of this disclosure, but not all of them.

At present, in an interaction process of audio-video segmentation, a pointer on a track of audio-video always has a split button displayed, the split button is used to trigger an audio-video split operation based on a split point positioned by the pointer. However, misoperation of audio-video segmentation may be caused due to reasons such as a user's mistriggering, which affects the user experience to some extent.

To this end, the present disclosure provides an interaction method of audio-video splitting. Specifically, firstly, detecting whether a selected clip exists in a target audio-video; if exists, entering a mode which performs splitting on the selected clip. Specifically, when detecting that a pointer on a track of the target audio-video is located in the selected clip, displaying a split button, and when receiving a trigger operation for the split button, the selected clip is split based on an intersection position of the pointer and the selected clip. As compared with the interaction mode in which the split button is resident on the pointer of the track, the embodiment of the present disclosure displays the split button when detecting that the pointer is located in the selected clip; because movement of the pointer to the selected clip indicates that the user currently has an audio-video splitting demand, display of the split button is triggered at this time to facilitate the user triggering a split operation on the selected clip. In addition, the split button is displayed only when the user has an audio-video splitting demand, which can reduce misoperation of audio-video splitting to the greatest extent, and improve the user experience to a certain extent.

In addition, if it is determined that no selected clip exists in the target audio-video, entering a target audio-video splitting mode, specifically, when detecting that a mouse moves to an intersection position of the pointer and the target audio-video, displaying the split button, and when receiving a trigger operation for the split button, splitting the target audio-video based on the intersection position of the pointer and the target audio-video. As compared with the interaction mode in which the split button is resident on the pointer of the track, the embodiment of the present disclosure displays the split button when no selected clip exists in the target audio-video and detecting that the mouse moves to the intersection position of the pointer and the target audio-video. Because movement of the mouse to the intersection position of the pointer and the target audio-video indicates that the user currently has an audio-video segmentation demand, display of the split button is triggered at this time to facilitate the user triggering a split operation on the target audio-video. In addition, the split button is displayed only when the user has an audio-video splitting demand, which can reduce misoperation of audio-video splitting to the greatest extent, and improve the user experience to a certain extent.

On such basis, the embodiment of the present disclosure provides an interaction method of audio-video splitting, FIG. 1 is a flow chart of the interaction method of audio-video splitting provided by the embodiment of the present disclosure. Referring to FIG. 1, the method includes:

S101: detecting whether a selected clip exists in a target audio-video.

In the embodiment of the present disclosure, the target audio-video may be either an audio file or a video file; the embodiment of the present disclosure may implement splitting of an audio or a video in a process of clipping the audio file or the video file. Specifically, splitting may be performed on the audio-video as a whole, or may also be performed on a certain clip in the audio-video.

In practical application, when the user has a splitting demand for a certain clip in the target audio-video, firstly, at least one clip is determined from the target audio-video as the selected clip. If the user has a splitting demand for the target audio-video as a whole, there is no need to determine the selected clip.

In an optional implementation, the selected clip may be determined by dragging the mouse on a track of the target audio-video. For example, the selected clip is composed of corresponding audio-video frames from a start position of the dragging mouse operation to an end position of the dragging mouse operation.

Because splitting the target audio-video as a whole and splitting the selected clip respectively correspond to different interaction modes, in the embodiment of the present disclosure, detecting whether a selected clip exists in the target audio-video before determining an interaction mode.

In an optional implementation, the start position and the end position of the selected clip may be recorded in parameters corresponding to the target audio-video; the detecting whether the selected clip exists in the target audio-video may specifically be detecting whether the start position and the end position of the selected clip are recorded in the parameters corresponding to the target audio-video. If the start position and the end position of the selected clip are recorded in the parameters, indicating that the selected clip exists in the target audio-video; if the record corresponding to the start position and the end position of the selected clip in the parameters is 0 or blank, indicating that the selected clip does not exist in the target audio-video.

S102: in response to the selected clip existing in the target audio-video, displaying a split button when detecting that a pointer on the track of the target audio-video is located in the selected clip.

In the embodiment of the present disclosure, if detecting that the selected clip exists in the target audio-video, entering a splitting mode for the selected clip; specifically, when detecting that the pointer on the track of the target audio-video is located in the selected clip, the split button is displayed; for example, the pointer on the track of the target audio-video being located in the selected clip indicates that the pointer on the track of the target audio-video is located between the start position and the end position of the selected clip (including the start position and the end position of the selected clip).

Figure 2:
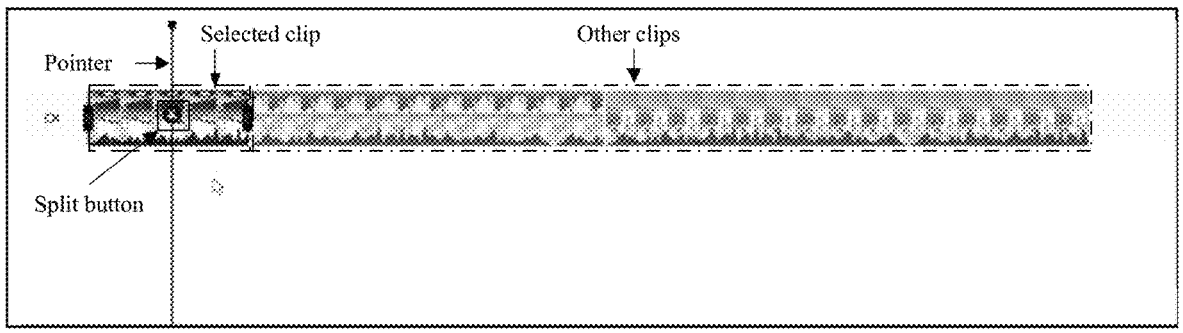
FIG. 2 is a schematic diagram of an interaction interface of audio-video splitting provided by the embodiment of the present disclosure.

As described in FIG. 2, FIG. 2 is a schematic diagram of an audio-video splitting interaction interface provided by the embodiment of the present disclosure, the pointer of the track is located in the selected clip of the target audio-video (shown in a dotted line box in FIG. 2), that is, at this time, the pointer of the track is located between the start position and the end position of the selected clip; accordingly, the split button is displayed on the interaction interface. In order to highlight the processed object of this splitting, other clips (as shown in a dotted dash line box in FIG. 2) before the selected clip are grayed out in FIG. 2. At this time, those clips that are grayed out cannot be split.

In an optional implementation, when detecting that the pointer on the track of the target audio-video is located in the selected clip, the split button may be displayed in a preset position on the interaction interface, for example, an upper right corner of the interaction interface.

In order to improve smoothness of the interaction process of audio-video splitting, so as to improve the user experience, the embodiment of the present disclosure may display the split button in an intersection position of the pointer and the selected clip, and as shown in FIG. 2, the intersection position of the pointer and the selected clip has the split button with a "scissors" pattern displayed. In practical application, after moving the pointer to the selected clip, the user may directly click the split button displayed in the intersection position of the pointer and the selected clip to trigger splitting for the selected clip, without further increasing interaction time for finding the split button located in other positions on the interaction interface.

In the embodiment of the present disclosure, when it is not detected that the pointer on the track of the target audio-video is located in the selected clip, the split button is not displayed, so as to avoid misoperation of audio-video splitting caused by the user's mistriggering.

In practical application, in a process when the user drags the pointer in the selected clip to determine the split point, the split button is always displayed in the intersection position of the pointer and the selected clip.

In another optional implementation, in order to more intuitively prompt the user of the position of the split point, when the user moves the mouse to the position of the split button, the intersection position of the pointer and the selected clip is highlighted, so that the user may clearly know the position of the split point before clicking the split button.

Figure 3:
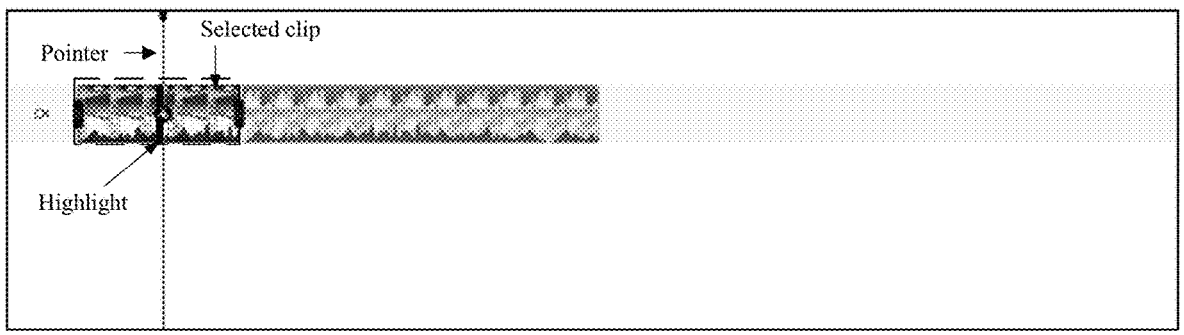
FIG. 3 is a schematic diagram of another interaction interface of audio-video splitting provided by the embodiment of the present disclosure.

As shown in FIG. 3, FIG. 3 is a schematic diagram of another audio-video splitting interaction interface provided by the embodiment of the present disclosure, a black bold line position is used for highlighting, and is used to more intuitively prompt the user of the position of the split point.

S103: in response to the trigger operation for the split button, splitting the selected clip based on the intersection position of the pointer and the selected clip.

In the embodiment of the present disclosure, when receiving the trigger operation for the split button, the selected clip is split. Specifically, the selected clip is split into two clips based on the intersection position of the pointer and the selected clip.

In the interaction method of audio-video splitting provided by the embodiments of the present disclosure, firstly, detecting whether the selected clip exists in the target audio-video; if yes, entering the splitting mode for the selected clip, specifically, when detecting that the pointer on the track of the target audio-video is located in the selected clip, displaying the split button, and when receiving the trigger operation for the split button, the selected clip is split based on the intersection position of the pointer and the selected clip. As compared with the interaction mode in which the split button is resident on the pointer of the track, the embodiment of the present disclosure displays the split button when detecting that the pointer is located in the selected clip. Because the movement of the pointer to the selected clip indicates that the user currently has an audio-video splitting demand, display of the split button is triggered at this time to facilitate the user triggering a split operation on the selected clip. In addition, the split button is displayed only when the user has an audio-video splitting demand, which can reduce misoperation of audio-video splitting to the greatest extent, and improve the user experience to a certain extent.

Figure 4:
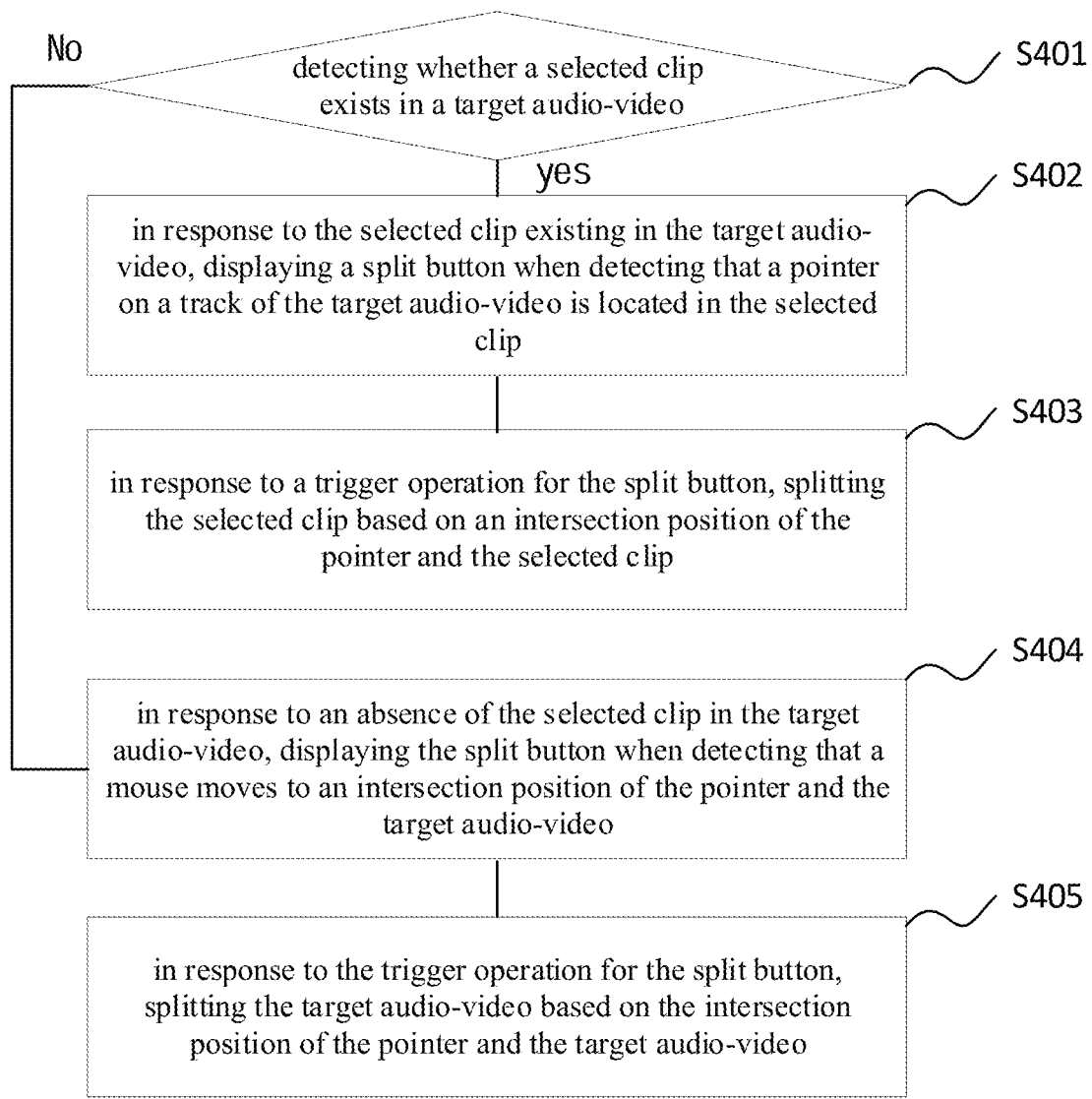
FIG. 4 is a flow chart of another interaction method of audio-video splitting provided by the embodiment of the present disclosure.

In order to further enrich the audio-video splitting interaction functions, the embodiment of the present disclosure further provides an interaction method of audio-video splitting. FIG. 4 is a flow chart of the interaction method of audio-video splitting provided by the embodiment of the present disclosure; and referring to FIG. 4, the method includes:

S401: detecting whether a selected clip exists in a target audio-video.

S402: in response to the selected clip existing in the target audio-video, displaying a split button when detecting that a pointer on a track of the target audio-video is located in the selected clip.

S403: in response to a trigger operation for the split button, splitting the selected clip based on an intersection position of the pointer and the selected clip.

S401 to S403 according to the embodiment of the present disclosure may be understood with reference to the description of S101 to S103 according to the above-described embodiment, and no details will be repeated here.

S404: in response to an absence of the selected clip in the target audio-video, displaying the split button when detecting that a mouse moves to an intersection position of the pointer and the target audio-video.

In the embodiment of the present disclosure, if detecting that no selected clip exists in the target audio-video, entering a mode of splitting the target audio-video as a whole; specifically, when detecting that the mouse moves to the intersection position of the pointer and the target audio-video, displaying the split button.

In an optional implementation, a caption may also be displayed above the track of the target audio-video; in the embodiment of the present disclosure, when detecting that the mouse moves to the intersection position of the pointer and the caption corresponding to the target audio-video, the step of displaying the split button may also be triggered.

Figure 5:
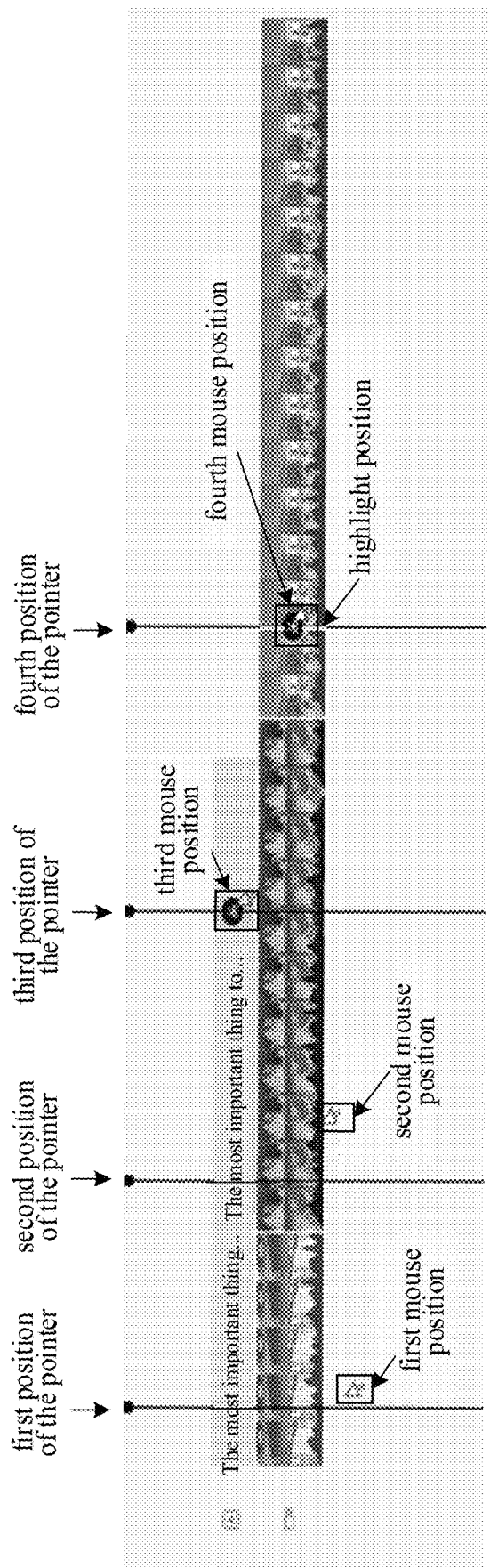
FIG. 5 is a schematic diagram of another interaction interface of audio-video splitting provided by the embodiment of the present disclosure.

As shown in FIG. 5, FIG. 5 is a schematic diagram of another audio-video splitting interaction interface provided by the embodiment of the present disclosure, and the interaction interface presents interaction when the pointer and mouse are located in different positions on the interaction interface. With respect to a first position of the pointer on the interaction interface, the mouse is in a first mouse position at this time, and because the mouse has not moved to the intersection position of the pointer and the target audio-video, nor is it located in the intersection position of the pointer and the caption corresponding to the target audio-video, the split button is not displayed. With respect to a second position of the pointer on the interaction interface, the mouse is in a second mouse position at this time, and because the mouse only moves to a display region of the target audio-video, but does not move to the second position of the pointer, nor is it located in the intersection position of the pointer and the caption corresponding to the target audio-video, the split button is not displayed. With respect to a third position of the pointer on the interaction interface, the mouse is located in a third mouse position at this time, and because the mouse moves to the intersection position of the pointer and the caption, the split button is displayed. With respect to a fourth position of the pointer on the interaction interface, the mouse is located in a fourth mouse position at this time, and because the mouse moves to the intersection position of the pointer and the target audio-video, the split button is displayed.

In order to improve smoothness of the interaction process of audio-video splitting, so as to improve the user experience, the embodiment of the present disclosure may display the split button in the intersection position of the pointer and the target audio-video, and as shown in the fourth position of the pointer in FIG. 5, the intersection position of the pointer and the target audio-video has the split button with a "scissors" pattern displayed. In practical application, the user may directly cut the target audio-video by moving the mouse to the intersection position of the pointer and the target audio-video and clicking the split button, making the interaction process smooth.

In the embodiment of the present disclosure, when it is not detected that the mouse moves to the intersection position of the pointer and the target audio-video, the split button is not displayed, so as to avoid misoperation of audio-video splitting caused by the user's mistriggering.

In another optional implementation, in order to more intuitively prompt the user of the position of the split point, when the user moves the mouse to the position of the split button, the intersection position of the pointer and the target audio-video is highlighted, so that the user may clearly know the position of the split point before clicking the split button.

As shown in the fourth position of the pointer in FIG. 5, a black bold line position is used for highlighting, and is used to more intuitively prompt the user of the position of the split point.

S405: in response to the trigger operation for the split button, splitting the target audio-video based on the intersection position of the pointer and the target audio-video.

In the embodiment of the present disclosure, when receiving the trigger operation for the split button, the target audio-video is split as a whole. Specifically, the target audio-video is split into two clips based on the intersection position of the pointer and the target audio-video.

In the embodiment of the present disclosure, if it is determined that no selected clip exists in the target audio-video, entering the splitting mode for the target audio-video, specifically, when detecting that the mouse moves to the intersection position of the pointer and the target audio-video, displaying the split button, and when receiving the trigger operation for the split button, splitting the target audio-video based on the intersection position of the pointer and the target audio-video. As compared with the interaction mode in which the split button is resident on the pointer of the track, the embodiment of the present disclosure displays the split button when no selected clip exists in the target audio-video (i.e., an absence of the selected clip in the target audio-video) and detecting that the mouse moves to the intersection position of the pointer and the target audio-video. Because movement of the mouse to the intersection position of the pointer and the target audio-video indicates that the user currently has an audio-video splitting demand, display of the split button is triggered at this time to facilitate the user triggering a split operation on the target audio-video. In addition, the split button is displayed only when the user has an audio-video splitting demand, which can reduce misoperation of audio-video splitting to the greatest extent, and improve the user experience to a certain extent.

Figure 6:
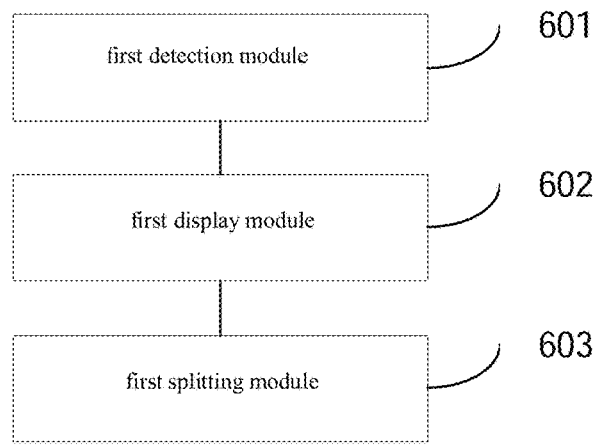
FIG. 6 is a structural schematic diagram of an interaction apparatus of audio-video splitting provided by the embodiment of the present disclosure.

Belonging to a same inventive concept as the above-described method embodiment, an embodiment of the present disclosure further provides an interaction apparatus of audio-video splitting, referring to FIG. 6, FIG. 6 is a structural schematic diagram of the interaction apparatus of audio-video splitting provided by the embodiment of the present disclosure; and the apparatus includes:

a first detection module 601, configured to detect whether a selected clip exists in a target audio-video;

a first display module 602, configured to display a split button upon detecting that a pointer on a track of the target audio-video is located in the selected clip and the selected clip exists in the target audio-video;

a first splitting module 603, configured to split the selected clip, in response to a trigger operation for the split button, based on an intersection position of the pointer and the selected clip.

Figure 7:
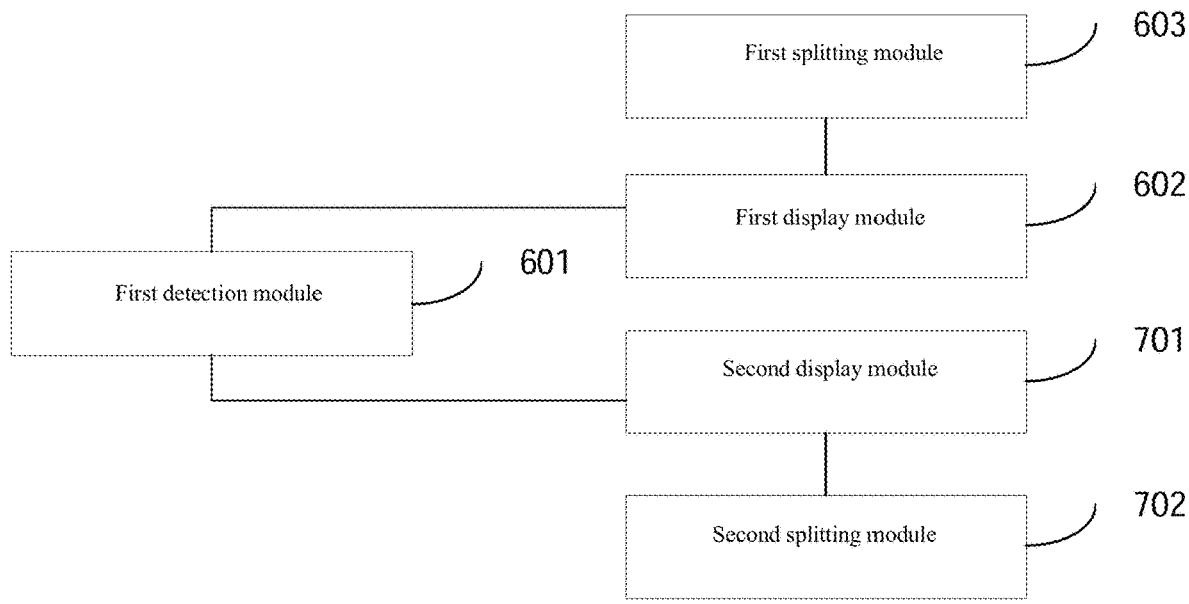
FIG. 7 is a structural schematic diagram of another interaction apparatus of audio-video splitting provided by the embodiment of the present disclosure.

In addition, the embodiment of the present disclosure also provides an interaction apparatus of audio-video splitting. FIG. 7 is a structural schematic diagram of another interaction apparatus of audio-video splitting provided by the embodiment of the present disclosure. Referring to FIG. 7, on the basis of FIG. 6, the apparatus further includes:

a second display module 701, configured to display the split button upon detecting that a mouse moves to an intersection position of the pointer and the target audio-video and the selected clip does not exist in the target audio-video;

a second splitting module 702, configured to split the target audio-video, in response to the trigger operation for the split button, based on the intersection position of the pointer and the target audio-video.

In an optional embodiment, the first display module is configured to:

in response to detecting that the pointer on the track of the target audio-video is located in the selected clip, display the split button in the intersection position of the pointer and the selected clip.

In an optional embodiment, the apparatus further includes:

a first highlight display module, configured to highlight, in response to detecting that a mouse moves to a position of the split button, the intersection position of the pointer and the selected clip.

In an optional embodiment, the second display module is configured to:

display, in response to detecting that the mouse moves to the intersection position of the pointer and the target audio-video, the split button in the intersection position of the pointer and the target audio-video.

In an optional embodiment, the apparatus further includes:

a second highlight display module, configured to highlight, in response to detecting that the mouse moves to a position of the split button, the intersection position of the pointer and the target audio-video.

In an optional embodiment, the apparatus further includes:

a third display module, configured to display the split button in response to detecting that the mouse moves to an intersection position of the pointer and a caption corresponding to the target audio-video.

As compared with the interaction mode in which the split button is resident on the pointer of the track, in interaction apparatus of the audio-video splitting provided by the embodiment of the present disclosure, the split button is displayed when no selected clip exists in the target audio-video and detecting that the mouse moves to the intersection position of the pointer and the target audio-video; or, the split button is displayed when the selected clip exists in the target audio-video and detecting that the pointer is located in the selected clip. The above-described opportunity of displaying the split button may indicate that the user currently has an audio-video splitting demand, and at this time, display of the split button is triggered to facilitate the user triggering the split operation. In addition, the split button is displayed only when the user has an audio-video splitting demand, which can reduce misoperation of audio-video splitting to the greatest extent, and improve the user experience to a certain extent.

Figure 8:
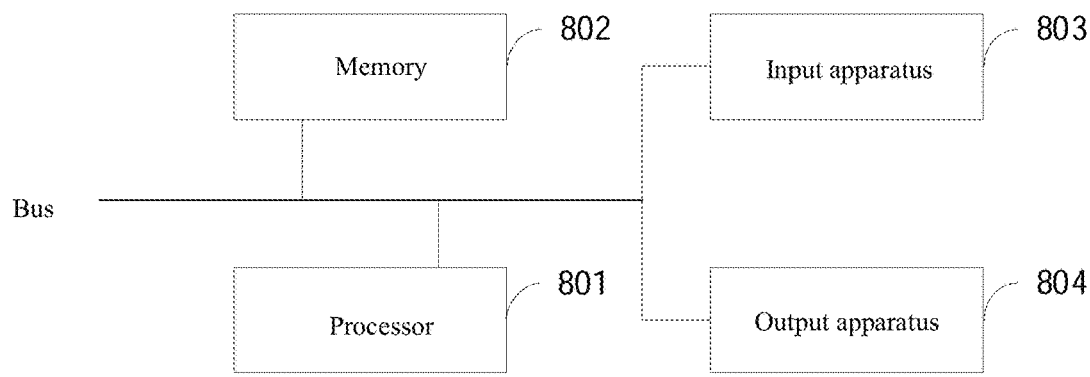
FIG. 8 is a structural schematic diagram of an interaction device of audio-video splitting provided by the embodiment of the present disclosure.

In addition, an embodiment of the present disclosure further provides an interaction device of audio-video splitting. As shown in FIG. 8, the device may include:

a processor 801, a memory 802, an input apparatus 803, and an output apparatus 804. The number of processors 801 in the video processing device may be one or more, taking one processor as an example in FIG. 8. In some embodiments of the present disclosure, the processor 801, the memory 802, the input apparatus 803 and the output apparatus 804 may be connected by a bus or other means, taking connection by a bus as an example in FIG. 8.

The memory 802 may be configured to store software program and module; and the processor 801 may execute various functional applications and data processing of the video processing device by running the software program and the module stored in the memory 802. The memory 802 may mainly include a program storage region and a data storage region, the program storage region may store an operating system, an application required for at least one function, etc. In addition, the memory 802 may include a high-speed random access memory, and may also include a nonvolatile memory, for example, at least one disk storage device, a flash memory, or other volatile solid-state storage device. The input apparatus 803 may be configured to receive input digital or character information and generate signal inputs related to user setting and function control of the interaction device of audio-video splitting.

Specifically, in this embodiment, the processor 801 will load executable files corresponding to the processes of one or more applications into the memory 802 according to instructions below, and the processor 801 may run the applications stored in the memory 802, thereby implementing various functions of the interaction device f audio-video splitting as described above.

It should be noted that in this specification, relational terms such as "first" and "second" are only used to distinguish one entity or operation from another entity or operation, without necessarily requiring or implying any such actual relationship or sequence between these entities or operations. Moreover, the term "include", "comprise" or any other variation thereof is intended to cover non-exclusive inclusion, so that a process, method, article or equipment that includes a series of elements not only includes those elements, but also includes other elements not explicitly listed, or also includes elements inherent to such process, method, article or equipment. Without further restrictions, the element defined by the statement "including one . . . " does not exclude the existence of another identical element in the process, method, article or equipment that includes the said element.

The above are only specific embodiments of the present disclosure to enable those skilled in the art to understand or realize the present disclosure. Many modifications to these embodiments will be obvious to those skilled in the art, and the general principles defined herein can be implemented in other embodiments without departing from the spirit or scope of this disclosure. Therefore, the present disclosure will not be limited to the embodiments described herein but will be accorded the widest scope consistent with the principles and novel features disclosed herein.

What is claimed is:

1. An interaction method of multimedia splitting, comprising:
   detecting whether a selected clip exists on a track in a target multimedia;
   in response to the selected clip existing on the track in the target multimedia, displaying a split button upon detecting that a pointer on the track of the target multimedia is located in the selected clip, wherein when it is not detected that the pointer on the track of the target multimedia is located in the selected clip, the split button is not displayed; and
   splitting the selected clip, in response to a trigger instruction on the split button, based on an intersection position of the pointer and the selected clip;
   wherein the displaying a split button upon detecting that a pointer on the track of the target multimedia is located in the selected clip, comprises:
   in response to detecting that the pointer on the track of the target multimedia is located in the selected clip, displaying the split button in the intersection position of the pointer and the selected clip.

2. The method according to claim 1, further comprising:
   in response to an absence of the selected clip in the target multimedia, displaying the split button upon detecting that a mouse moves to an intersection position of the pointer and the target multimedia; and
   splitting the target multimedia, in response to the trigger instruction on the split button, based on the intersection position of the pointer and the target multimedia.

3. The method according to claim 1, wherein before the splitting the selected clip, in response to a trigger instruction on the split button, based on an intersection position of the pointer and the selected clip, the method further comprises:
   highlighting, in response to detecting that a mouse moves to a position of the split button, the intersection position of the pointer and the selected clip.

4. The method according to claim 2, wherein the displaying the split button upon detecting that a mouse moves to an intersection position of the pointer and the target multimedia, comprises:
   displaying, in response to detecting that the mouse moves to the intersection position of the pointer and the target multimedia, the split button in the intersection position of the pointer and the target multimedia.

5. The method according to claim 4, wherein before the splitting the target multimedia, in response to the trigger instruction on the split button, based on the intersection position of the pointer and the target multimedia, the method further comprises:
   highlighting, in response to detecting that the mouse moves to a position of the split button, the intersection position of the pointer and the target multimedia.

6. The method according to claim 4, wherein after the response to an absence of the selected clip in the target multimedia, and before the splitting the target multimedia, in response to the trigger instruction on the split button, based on the intersection position of the pointer and the target multimedia, the method further comprises:
   triggering, in response to detecting that the mouse moves to an intersection position of the pointer and a caption corresponding to the target multimedia, a step of displaying the split button.

7. The method according to claim 2, wherein before the splitting the target multimedia, in response to the trigger instruction on the split button, based on the intersection position of the pointer and the target the method further comprises:
   highlighting, in response to detecting that the mouse moves to a position of the split button, the intersection position of the pointer and the target multimedia.

8. The method according to claim 7, wherein after the response to an absence of the selected clip in the target multimedia, and before the splitting the target multimedia, in response to the trigger instruction on the split button, based on the intersection position of the pointer and the target multimedia, the method further comprises:
   triggering, in response to detecting that the mouse moves to an intersection position of the pointer and a caption corresponding to the target multimedia, a step of displaying the split button.

9. The method according to claim 2, wherein after the response to an absence of the selected clip in the target multimedia, and before the splitting the target in multimedia, in response to the trigger instruction on the split button, based on the intersection position of the pointer and the target multimedia, the method further comprises:
   triggering, in response to detecting that the mouse moves to an intersection position of the pointer and a caption corresponding to the target multimedia, a step of displaying the split button.

10. The method according to claim 1, wherein before the splitting the selected clip, in response to a trigger instruction on the split button, based on an intersection position of the pointer and the selected clip, the method further comprises:
    highlighting, in response to detecting that a mouse moves to a position of the split button, the intersection position of the pointer and the selected clip.

11. A device, comprising: a memory, a processor, and a computer program stored in the memory and run on the processor,
    wherein upon executing the computer program, the method according to claim 1 is achieved by the processor.

12. An interaction apparatus of multimedia splitting, comprising a memory, a processor, and instructions stored in the memory and run on the processor,
    wherein upon executing the instructions, the processor is configured to:
    detect whether a selected clip exists on a track in a target multimedia;
    display a split button upon detecting that a pointer on the track of the target multimedia is located in the selected clip in response to the selected clip existing on the track in the target multimedia, wherein when it is not detected that the pointer on the track of the target multimedia is located in the selected clip, the split button is not displayed; and
    split the selected clip, in response to a trigger instruction on the split button, based on an intersection position of the pointer and the selected clip;
    wherein upon executing the instructions, the processor is further configured to:
    in response to detecting that the pointer on the track of the target multimedia is located in the selected clip, display the split button in the intersection position of the pointer and the selected clip.

13. The apparatus according to claim 12, wherein upon executing the instructions, the processor is further configured to:
   display the split button upon detecting that a mouse moves to an intersection position of the pointer and the target multimedia in response to an absence of the selected clip in the target multimedia; and
   split the target multimedia, in response to the trigger instruction on the split button, based on the intersection position of the pointer and the target multimedia.

14. The apparatus according to claim 13, wherein upon executing the instructions, the processor is further configured to:
   display, in response to detecting that the mouse moves to the intersection position of the pointer and the target multimedia, the split button in the intersection position of the pointer and the target multimedia.

15. The apparatus according to claim 13, wherein upon executing the instructions, the processor is further configured to:
   highlight the intersection position of the pointer and the target multimedia in response to detecting that the mouse moves to a position of the split button.

16. The apparatus according to claim 13, wherein upon executing the instructions, the processor is further configured to:
   display the split button in response to detecting that the mouse moves to an intersection position of the pointer and a caption corresponding to the target multimedia.

17. A non-transitory computer-readable storage medium, wherein the non-transitory computer-readable storage medium stores instructions, and when the instructions are run on a terminal device, the terminal device is enabled to implement an interaction method of multimedia splitting,
   wherein the interaction method of multimedia splitting comprises:
   detecting whether a selected clip exists on a track in a target multimedia;
   in response to the selected clip existing on the track in the target multimedia, displaying a split button upon detecting that a pointer on the track of the target multimedia is located in the selected clip, wherein when it is not detected that the pointer on the track of the target multimedia is located in the selected clip, the split button is not displayed; and
   splitting the selected clip, in response to a trigger instruction on the split button, based on an intersection position of the pointer and the selected clip;
   wherein the displaying a split button upon detecting that a pointer on the track of the target multimedia is located in the selected clip, comprises:
   in response to detecting that the pointer on the track of the target multimedia is located in the selected clip, displaying the split button in the intersection position of the pointer and the selected clip.

* * * * *